United States Patent Office 2,772,274
Patented Nov. 27, 1956

2,772,274
HETEROCYCLIC VAT DYESTUFFS

Wilhelm Schmidt-Nickels, Little York, N. J., and Lewis J. Lugg, Pen Argyl, Pa., assignors to General Aniline & Film Corporation, New York, N. Y., a corporation of Delaware No Drawing. Application December 28, 1954, Serial No. 478,171

12 Claims. (Cl. 260—295)

This invention relates to the production of novel heterocyclic vat dyestuffs having the formula

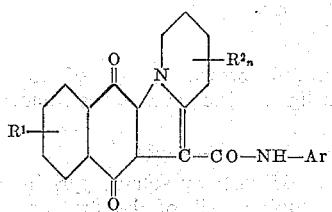

wherein Ar represents an aryl radical; $R^1$ is selected from the group consisting of hydrogen, nitro, amino and halo; $R^2$ is selected from the group consisting of alkyl and halo; and $n$ has a value of 0 to 3.

It has been found that these compounds constitute a group of improved vat dyestuffs which produce a wide range of shades of good fastness to washing, chlorine and light when dyed and printed in the usual manner.

The dyestuffs of this invention may be produced by the reaction of a 2,3-dihalo-1,4-naphthoquinone with a pyridine unsubstituted in the 2-position and an N-aromatic acetoacetamide of the formula $$CH_3—CO—CH_2—CO—NH—Ar$$

The exact mechanism of the reaction is not clearly understood, but it is believed that it proceeds in the manner portrayed in the following equations wherein 2,3-dichloro-1,4-naphthoquinone is reacted with pyridine and 2-acetoacetamino-fluorenone:

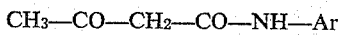

It will be understood that in carrying out the foregoing reaction, the reactants may contain inert substituents which do not interfere with the desired reaction. Thus, the aryl residue of the N-aromatic acetoacetamide may comprise a radical of the benzene or naphthalene series which may further contain nuclear substituents, fused rings, etc., for example, halo-, such as chloro- or bromo-; alkoxy-, such as methoxy-, ethoxy-, propoxy-, or butoxy-; alkyl-, such as methyl-, ethyl-, or butyl-; phenyl-; naphthyl-; phenylene-; benzoylene-; phenylenesulfone-, or the like, with or without additional acetoacetoamide groups. The 1,4-naphthoquinone has its 2 and 3 positions substituted by chlorine or bromine atoms. In the reactants, $R^1$ may be nitro and $R^2$ may be alkyl, such as, methyl, ethyl, propyl, isopropyl, or butyl. Products wherein $R^1$ is amino are obtained by reduction of the corresponding product in which $R^1$ is nitro, while products wherein $R^1$ and/or $R^2$ are halo are obtained by subsequent halogenation with chlorine or bromine. The reaction takes place readily in proportions of about one molecular equivalent of the 2,3-dihalo-1,4-naphthoquinone and one molecular equivalent of the pyridine for each acetoacetamide group in the N-aromatic acetoacetamide. Thus, where the N-aromatic acetoacetamide contains one acetoacetamide group, as shown in the reaction portrayed above, the reaction takes place between 1 mole of each of the reactants. Where the N-aromatic acetoacetamide contains two acetoacetamide groups, as in examples 3 and 4 below, the reaction takes place between 2 moles of the 2,3-dihalo-1,4-naphthoquinone, 2 moles of the pyridine, and 1 mole of the N-aromatic acetoacetamide.

Since the reaction involves liberation of HCl, it is desirable to conduct the reaction in the presence of an acid acceptor. It is preferable to employ the pyridine reactant in an amount in excess of that required for the instant reaction. The excess pyridine serves as an acid acceptor and as a convenient liquid medium in which to carry out the reaction. However, other liquid media may be employed which boil within or above the range of temperatures required for the reaction which may be from about 30° to 150° C. Selection of a liquid medium which boils at the desired reaction temperature facilitates temperature control since the reaction may then be carried out under reflux. The reaction product is usually insoluble in the liquid medium employed for the reaction and the precipitate may be readily separated by filtration, washing, and the like. However, in instances where the reaction product is soluble in the liquid medium, it may be conveniently separated by drowning in water followed by filtration, washing, and the like.

If desired, the vat dyestuffs of this invention may be converted into the alkali metal salts of the polysulfuric acid esters of their leuco forms by the usual known methods such as by treatment with a reducing agent or metal in pyridine-chlorosulfonic acid solution, or by first reducing to the leuco compound and then esterifying in the normal way in an aqueous solution by the action of tertiary amine addition products of sulfur trioxide or in any other suitable manner, followed by treatment with a suitable sodium or potassium compound to produce the desired salt.

The dyestuffs of this invention may be employed for coloring, dyeing or printing film or fibrous material in any form and having a basis of natural or artificial polymeric material, such as cotton or other natural cellulosic

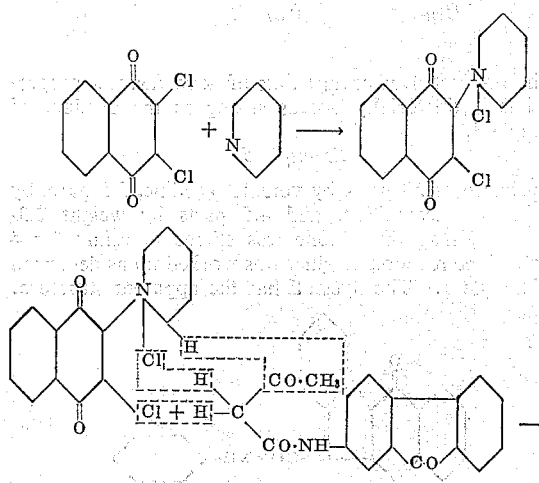
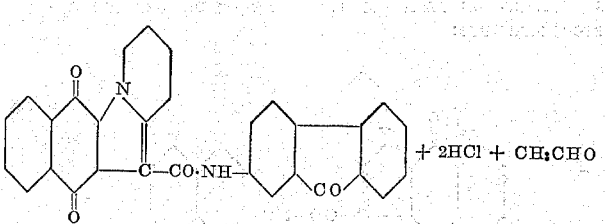

material, regenerated cellulose, such as derived by the viscose or cuprammonium process, or by saponification of cellulose esters, or other material capable of being colored by vat dyestuffs in soluble, dispersed, or pigment form.

The following examples are illustrative of preferred embodiments of this invention and are not to be regarded as limitative. Parts are in grams by weight, in cc. by volume.

Example 1

A charge of 40 parts by volume pyridine, 4.0 parts by weight 2-acetoacetamino-fluorenone and 3.2 parts by weight 2,3-dichloro-1,4-naphthoquinone was stirred at reflux for 4 hours. The reaction product was filtered off at room temperature, washed with pyridine, acetone, water, and dried. The dyestuff has the apparent structure:

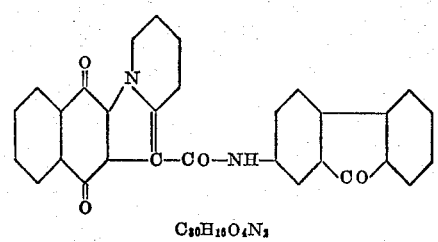

$C_{30}H_{16}O_4N_2$

Found: N=5.76%. Theory for $C_{30}H_{16}O_4N_2$: N=5.98%.

The product dyes cotton from an alkaline hydrosulfite vat in violet shades of good fastness to washing, chlorine, and light.

Example 2

A charge of 50 parts by volume pyridine, 4.5 parts by weight acetoacet-beta-naphthylamide, and 4.5 parts by weight 2,3-dichloro-1,4-naphthoquinone was stirred at reflux for 4 hours. The reaction product was worked up as described in Example 1. The dyestuff has the apparent structure:

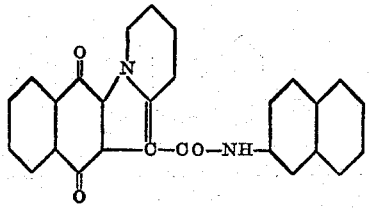

and gives violet dyeings of a similar shade and the same fastness properties as the product of Example 1, although tinctorially not as strong.

Example 3

A charge of 45 parts by volume pyridine, 4.1 parts by weight bis-acetoacet-benzidine-sulfone of the structure

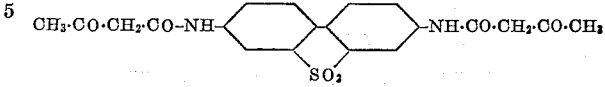

and 4.5 parts by weight 2,3-dichloro-1,4-naphthoquinone was stirred at reflux for 4 hours. The reaction product was worked up as described in Example 1. The dyestuff has the apparent structure:

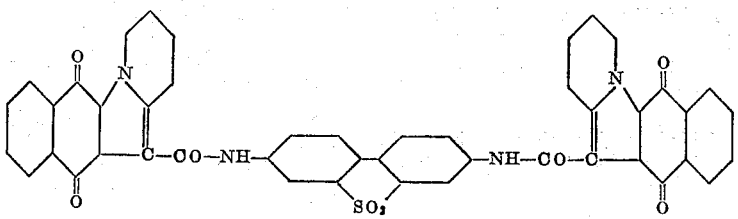

and gives reddish brown dyeings of good fastness to chlorine and light. The shade turns somewhat yellower on washing.

Example 4

A charge of 45 parts by volume pyridine, 3.8 parts by weight "Naphthol AS–G" of the structure

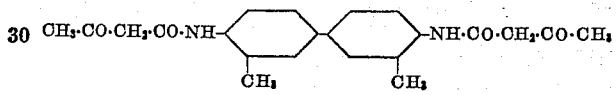

and 4.5 parts by weight 2,3-dichloro-1,4-naphthoquinone was stirred at reflux for 4 hours. The reaction mixture was poured into 450 parts by volume water. After stirring for 30 minutes the reaction product was filtered off, washed with warm water until free of pyridine, and dried. The dyestuff has the apparent structure:

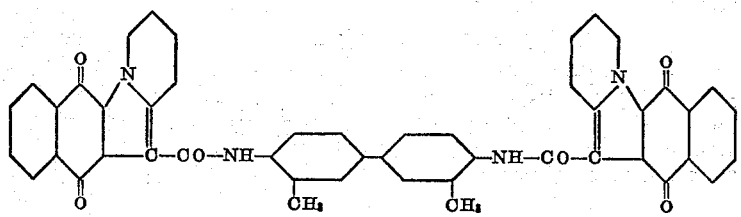

The product dyes orange tints of good fastness properties but is tinctorially not as strong as the product of Example 3.

Example 5

A charge of 50 parts by volume pyridine, 3.5 parts by weight acetoacetanilide, and 4.5 parts by weight 2,3-dichloro-1,4-naphthoquinone was stirred at reflux for 4 hours. The reaction product was worked up as described in Example 1. The dyestuff has the apparent structure:

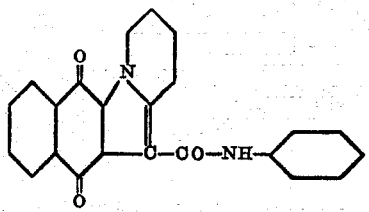

$C_{23}H_{14}O_3N_2$

Found: N=7.42%. Theory for $C_{23}H_{14}O_3N_2$: N=7.65%.

The product dyes pink although tinctorially not very strong.

This invention has been disclosed with respect to certain preferred embodiments, and various modifications and variations thereof will become obvious to the person skilled in the art. It is to be understood that such modifications and variations are to be included within the spirit and purview of this application and the scope of the appended claims.

We claim:

1. A dyestuff having the formula

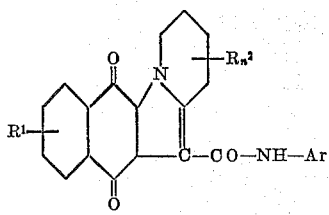

wherein Ar represents an aryl radical; $R^1$ is selected from the group consisting of hydrogen, nitro, amino and halo; $R^2$ is selected from the group consisting of lower alkyl and halo; and $n$ has a value of 0 to 3.

2. A process for producing a dyestuff as defined in claim 1 comprising reacting by heating a 2,3-dihalo-1,4-naphthoquinone having the formula

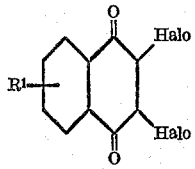

wherein $R^1$ is selected from the group consisting of hydrogen, nitro, amino and halo, a pyridine having the formula

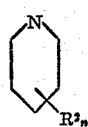

in which the 2-position is unsubstituted, $R^2$ is selected from the group consisting of lower alkyl and halo, and $n$ has a value of 0 to 3, and an N-aromatic acetoacetamide of the formula $CH_3—CO—CH_2—CO—NH—Ar$ wherein Ar represents an aryl radical.

3. A dyestuff of the formula

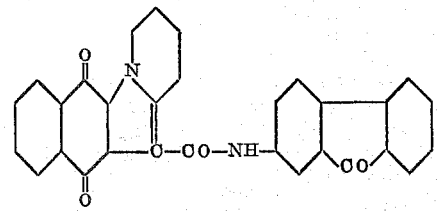

4. A process for producing a dyestuff as defined in claim 3 comprising reacting by heating 2,3-dichloro-1,4-naphthoquinone, pyridine, and 2-acetoacetamino-fluorenone.

5. A dyestuff of the formula

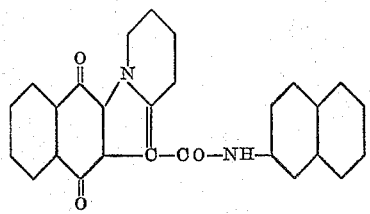

6. A process for producing a dyestuff as defined in claim 5 comprising reacting by heating 2,3-dichloro-1,4-naphthoquinone, pyridine, and acetoacet-beta-naphthylamide.

7. A dyestuff of the formula

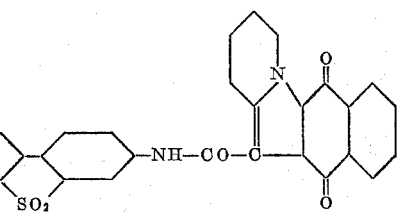

8. A process for producing a dyestuff as defined in claim 7 comprising reacting by heating 2,3-dichloro-1,4-naphthoquinone, pyridine, and bis-acetoacet-benzidine-sulfone.

9. A dyestuff of the formula

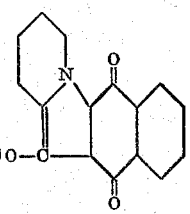

10. A process for producing a dyestuff as defined in claim 9 comprising reacting by heating 2,3-dichloro-1,4-naphthoquinone, pyridine, and a compound having the formula

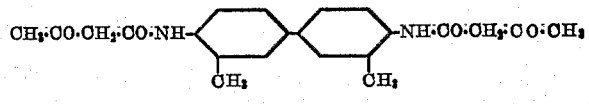

11. A dyestuff of the formula

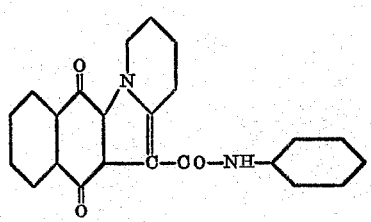

12. A process for producing a dyestuff as defined in claim 11 comprising reacting by heating 2,3-dichloro-1,4-naphthoquinone, pyridine, and acetoacetanilide.

No references cited.